Figure 1:
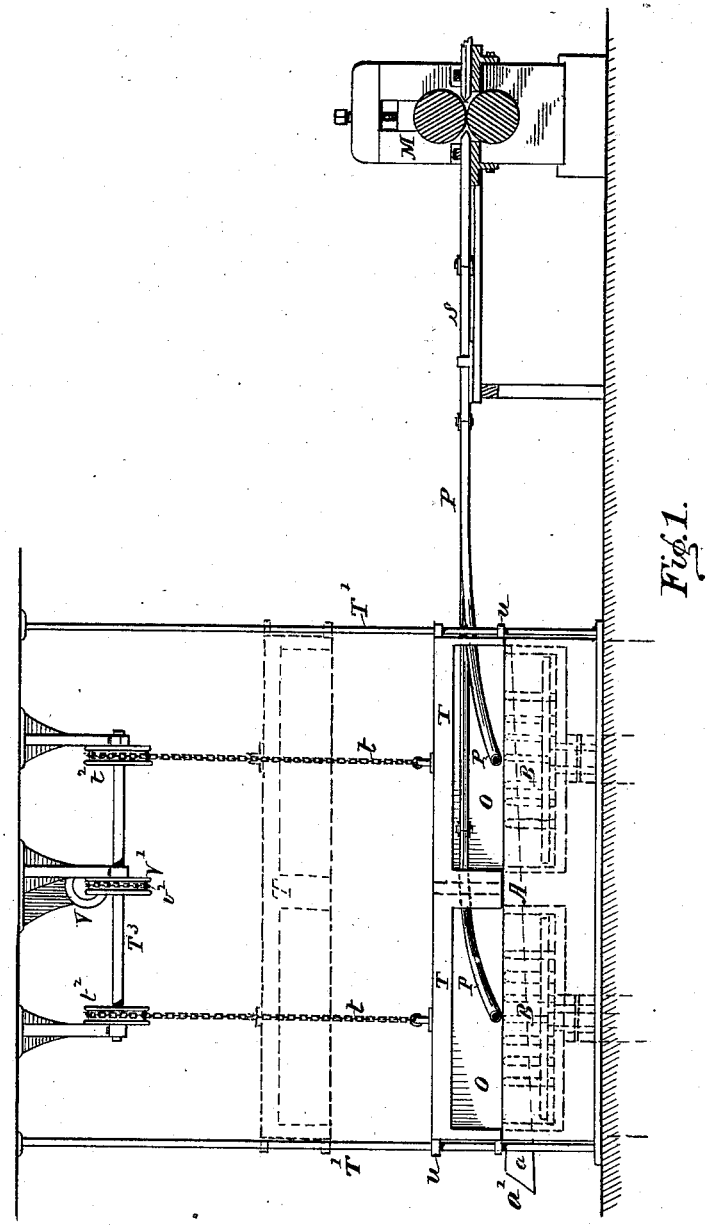

(No Model.) 2 Sheets—Sheet 1.

F. H. DANIELS.
MECHANISM FOR COILING WIRE RODS.

No. 373,965. Patented Nov. 29, 1887.

Witnesses:
N. R. Barton
Ella P. Blenus.

Inventor:
Fred H. Daniels
By Chas H. Burleigh
Attorney (No Model.) 2 Sheets—Sheet 2.
F. H. DANIELS.
MECHANISM FOR COILING WIRE RODS.
No. 373,965. Patented Nov. 29, 1887.
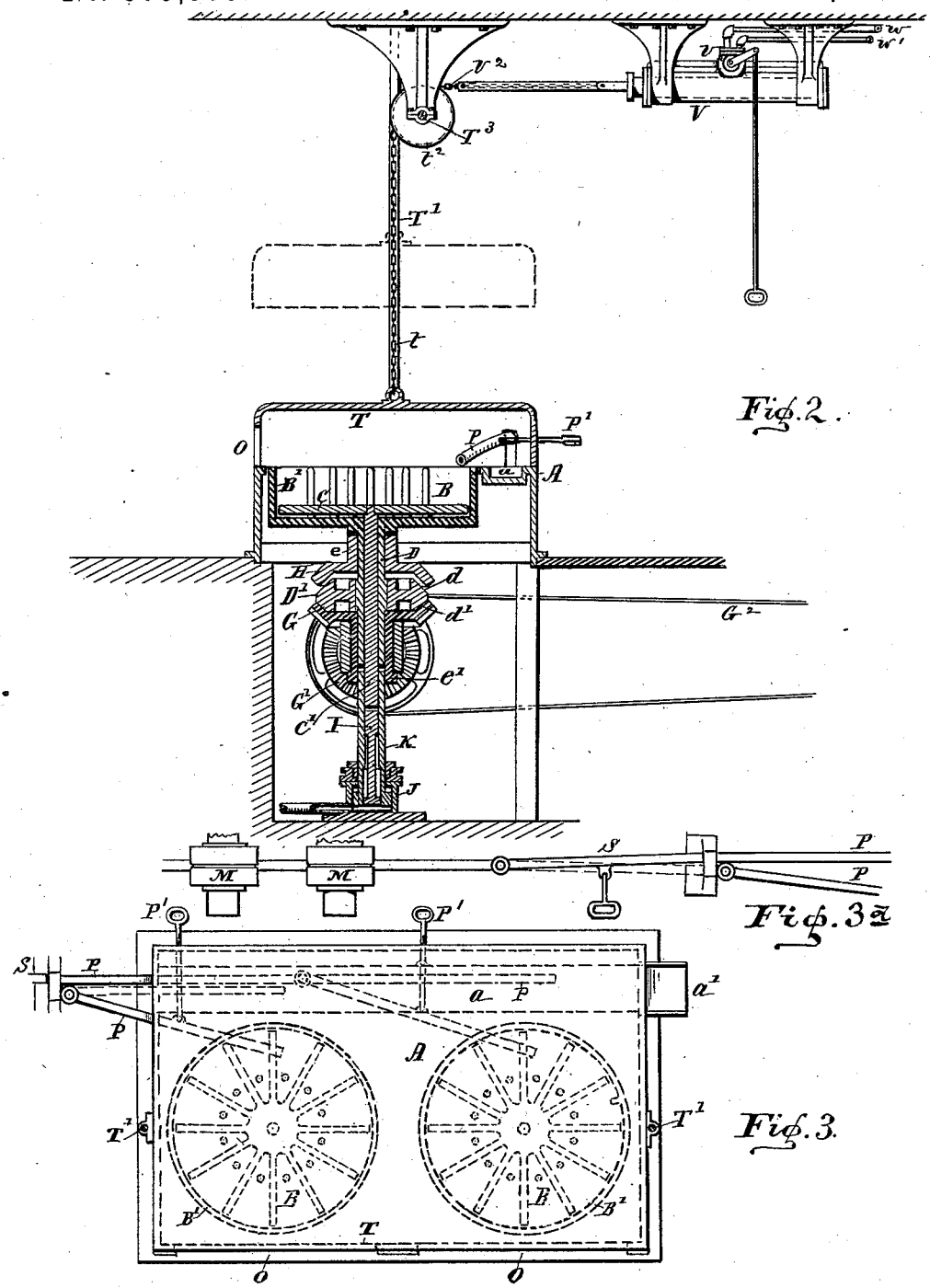

UNITED STATES PATENT OFFICE.

FRED H. DANIELS, OF WORCESTER, MASSACHUSETTS.

MECHANISM FOR COILING WIRE RODS.

SPECIFICATION forming part of Letters Patent No. 373,965, dated November 29, 1887.

Application filed March 30, 1887. Serial No. 232,991. (No model.)

*To all whom it may concern:*

Be it known that I, FRED H. DANIELS, a citizen of the United States, residing at Worcester, in the county of Worcester and State of Massachusetts, have invented certain new and useful Improvements in Mechanism for Coiling Wire Rods, of which the following, together with the accompanying drawings, is a specification sufficiently full, clear, and exact to enable persons skilled in the art to which this invention appertains to make and use the same.

The object of this my present invention is to provide, in an apparatus for reeling hot-wire rods, a shield, guard, or cover to contain the reel mechanism and prevent accidents from the swinging of ends or loops of rod in case the rod is not completely coiled into or about the revolving reeling device, or in case any portion of the rod becomes loose and is thrown from the reel by centrifugal action; also, to provide, in combination with a wire-rod-reeling mechanism, a guard, hood, or cover having doors or openings in the side thereof through which the coiled wire rod can be removed bodily from the reel; also, to provide, in combination with a wire-rod-reeling mechanism and a removable guard, hood, or cover for the same, of mechanism for elevating or lifting said guard to permit access to the reel when desired.

Another object of my invention is to afford, in connection with mechanism for reeling hot-wire rods as they come from the rolling-mill, facilities for directing the rod either onto the reel or so that it will run out upon the table or floor of the mill, as desired.

These objects I attain by mechanism the nature, construction, and operation of which is explained in the following description, the particular subject-matter claimed being hereinafter definitely specified.

In the drawings, Figure 1 is a front view of a wire-rod-reeling apparatus, illustrating the nature of my invention. Fig. 2 is a transverse vertical section of the same. Fig. 3 is a plan view of the reels and guard-hood, and Fig. 3ª shows the guide-pipes and switch in continuation of Fig. 3.

In referring to parts, A denotes a frame, platform, or table having openings in its top within which the reels or coiling-receptacles B B are arranged to revolve, the operating mechanism being disposed within a pit or chamber beneath the said table, and preferably inclosed thereby, and by side plates, so that only the top of the reels are exposed. The top level of the reel receptacles or fingers are preferably disposed level, or nearly so, with the top surface of the table A and with the peripheral rim of the reeling-receptacle, making a comparatively close joint therewith at the adjacent edges, so that portions of rod will not be liable to pass between the reel and table.

At the back of the reels I have in the present instance provided a trough or depressed space, $a$, extending along the table in a direction leading from the delivery-guides. Said trough is preferably inclined downward toward its delivery end $a'$ and opens above a receiving floor or platform, onto which the rods can be directed and distributed when desired. The coiling receptacles or reels B are preferably made as rotatable tubs, or with cylindrical rims B' about their periphery, and with an inner row or circle of upwardly-extending pins or fingers, $b'$, fixed to the bottom plate or reel-head, which, together with said rim, forms an annular space or receptacle into which the rods are delivered to be coiled by rotation of the reel. If preferred, the reel might be made with an outer circle or row of upright pins, or in any other suitable form, for equivalent operation in coiling the rod. A coil-supporter, C, is disposed above the reel-head, onto which supporter the rod is deposited and coiled, and elevating mechanism is combined with said supporter for lifting it, together with the coil of rod, to a position above the top level of the reel-fingers.

The features of the supporter, supporter-lifting mechanism, and reel-operating mechanism I have made the subject-matter of claims in a separate application for Letters Patent, Serial No. 206,323. Therefore I do not include such features as a part of the invention claimed and embraced in this my present application.

The means for supporting and operating the reels may be of any suitable character and construction, as I do not herein make claim to any particular form of driving devices as essentially included in my present invention. The driving devices shown will, however, be briefly described to afford a clear understanding of the apparatus and as setting forth a suitable mechanism for the purpose.

D denotes a hollow shaft to which the reel-head is fixed, said shaft being revoluble in bearings $e\ e'$ on the frame and carrying a friction-wheel, D', having upper and lower friction-surfaces, $d$ and $d'$. A stationary friction-rim, H, to match the upper surface, $d$, is fixed to the bearing $e$, and working in the under bearing, $e'$, is a sleeve carrying a gear, G, whereon is formed or attached a friction-rim that matches the lower surface, $d'$, of the wheel D'.

The lifting-supporter C is fixed on the end of a shaft, C', disposed within the hollow shaft D. Said shaft D is longitudinally movable in its bearings, so that the friction-surfaces at $d$ or $d'$ can be brought into contact by raising or depressing the shaft. When depressed, the friction-surface $d'$ engages with the gear G, and rotary movement is imparted thereby to the reel or receptacle B, and when elevated the friction-surface $d$ engages with the stationary rim H for stopping the rotation of the reel. The mechanism is driven by suitable gearing, $G'$, and a driving-belt, $G^2$, running on pulleys; or motion may be transmitted thereto by any other convenient means and from any suitable motor.

J indicates a cylinder containing a hollow plunger, K, disposed beneath the shaft D, and adapted for operating by hydraulic, pneumatic, or steam pressure for raising said shaft and friction-wheel when stopping and starting the reel.

I indicates a secondary plunger or piston-rod working through the plunger K, and arranged for lifting and lowering the supporter C by action on its shaft C'.

The operating-valves for controlling the pressure in the cylinder J, and the means for locking or retaining the parts at positions of adjustment, may be of any desired construction, as they do not form any essential part of the invention claimed herein, but are included in my former application, hereinbefore referred to.

The guide-pipes P, by which the hot rods are conducted from the finishing-rolls of the rolling-mill M, are located above the trough $a$, and are jointed and hinged in such manner that their delivery ends can be swung into line either with the coiling-receptacles or with the trough $a$, (see Figs. 3 and $3^a$,) so as to deliver the rod into said receptacle, or so it will run out upon the floor at the end $a'$ of the trough. Handles P' or other suitable means are provided for moving the guide-pipes as required. The rod is introduced into the guide-pipes direct from the rolling-mill M, and a suitable switch device, S, is employed for directing alternate rods into the right or left guide-pipe or to the several reels.

T indicates a guard, hood, or cover, which I arrange in combination with and adjacent to the revolving parts of the reeling mechanism for inclosing the same and preventing escape therefrom while the reel is in motion of any ends, loops, or portions of the hot rods that might otherwise become loose and be swung around in space by the rapid revolving action of the reel. I thus obviate a source of great danger to the attendants or workmen from the throwing or swinging around of such loose ends or loops of rod, as are for any reason or accident not properly coiled into the receptacle or about the reel-fingers.

The guard, hood, or cover T is in the present instance provided with doors or openings O, (one or more, as required,) through which to take out the coiled rods after they have been wound up by the reel, said coils being removed bodily by means of tongs or other suitable handling implements. If desired, hinged or sliding plates may be employed in connection with the guard-hood as movable doors for closing the openings O. The guard or hood T is suspended from an overhead support by means of chains $t$ or other supporting connections in such manner that it can be readily raised or moved from the table or platform at any time to allow access to the reel mechanism beneath it.

Guides T' are provided in the present instance at the ends of the table A, to prevent the guard from swinging out of place as it is hoisted up and down. Said guides preferably consist of upright rods or bars, to which the guard T is connected by sliding ear-plates, lugs, or equivalent engaging devices $u$, so as to retain the guard or cover T in proper relation and alignment to said guide-rods and reel as it is moved up and down from and to the reel-receptacle and its supporting-platform A.

The lifting mechanism employed for raising the guard or hood T may be of any suitable kind. In the present instance I employ a hydraulic cylinder and piston, V. The chains $t$ are connected to sheaves $t^2$ on a revoluble overhead shaft, $T^3$, which shaft carries a sheave, V', to which the piston-chain $v^2$ is connected. The piston-action is controlled by the valve $v$ and pressure of water supplied by pipes $w\ w'$.

The guard T is in the present drawings shown rectangular and for covering two reels; but, if preferred, it might be made single, or so as to cover but one reel, and could be circular or of other form.

I have in certain other applications for Letters Patent described and claimed different forms of guards for revolving reels for reeling wire rod—viz., in application Serial No. 219,379 I have shown a movable cylindrical guard combined with a coil-supporter and means for simultaneously raising said guard and supporter, while in Serial No. 219,869 I have described and claimed a stationary form of guard surrounding the reel as a curb. It will therefore be understood that the present application is intended to cover a wire-rod reel and a guard, for the purpose set forth, broadly, while my other cases referred to embrace particular kinds of guard mechanism and combinations of different nature from those herein defined.

In the operation of my improved apparatus the rod is led to the reels or coiling-receptacles through the pipes P, and is delivered to the annular space and coiled by the rotation of said reels. The two reels are operated alternately, one reel being unloaded while the other is being filled. When the coil is completed, it is removed bodily through the door or opening in the side of the guard-hood. In case of any accident or derangement of the mechanism during the coiling of the rod the pipe P can be shifted or swung back over the trough $a$, so that the balance of the rod, instead of being tangled up in the reeling mechanism, is directed out upon the receiving-floor, and the wasting of rods is thus avoided.

In lieu of making the cover or hood T for the reels with doors or openings O for discharging the rod, the cover may in some instances be made in two parts, or as a hood for each of the coiling-receptacles independently, and be arranged to be raised by the chain $t$, or otherwise lifted from the platform, to give access to the coiling-receptacle and permit the convenient discharge of the wire rod. Such single covers I have indicated by dotted lines in Fig. 1. These covers may be provided with a slot or opening in case it is not desired to extend them over the trough $a$, to permit the end of the guide-pipe to swing to and from the reel.

What I claim as of my invention, and desire to secure by Letters Patent, is—

1. In apparatus for reeling wire rods, the combination, with the revoluble reel or coiling device, of a guard surrounding and inclosing the top of the reel, with a space contiguous to and above the top opening of the reel, and disposed for confining the rod adjacent thereto, substantially as hereinbefore set forth.

2. The combination, with a reel or coiling-receptacle for reeling wire rods, of a movable guard-hood covering said reel and means for raising and lowering said hood, substantially as set forth.

3. The combination, with a reel for reeling wire rods, of a guard-hood covering said reel, and provided with a door or doors in its side through which the coil of wire rod is removed bodily from the reel, substantially as described.

4. A reeling apparatus having a revoluble reel and a guiding way or trough into which the rod can be switched in case of accident or derangement of the reel during the delivery of the rod.

5. The combination, with a rolling-mill, of a reel or coiling devices, a direct conductor or trough adjacent thereto, and a switching delivery-guide, whereby the product from the rolling-mill can be switched from the reel to the conducting-trough in case of derangement during the delivery of the product, substantially as set forth.

6. The table or platform A, provided with the depression or trough $a$, in combination with a rod-coiling mechanism and delivering-guides, substantially as set forth.

7. The combination, of a revoluble rod-coiling receptacle, a direct conductor or trough adjacent thereto, an adjustable guide adapted for delivering the rod into said receptacle or for delivering it past the receptacle into said conductor, accordingly as said guide is adjusted, and a cover or protecting-guard, substantially as set forth.

8. The combination of a revoluble rod-coiling receptacle or reel, a platform covering the reel-operating mechanism, and a hood or guard arranged over said reel adjacent to and encompassing a space above the open end thereof, for the purposes set forth.

9. The combination of a revoluble rod-coiling receptacle or reel, a platform covering the reel-operating mechanism, a hood or guard arranged over and about the space adjacent to the top end of said reel, and means for elevating and lowering said hood, substantially as and for the purpose described.

10. The combination of the table or platform A, the revoluble rod-coiling receptacles B, arranged in openings within said table, and the removable hood or guard T, having the openings O, substantially as described.

11. The combination of the revoluble rod-coiling receptacle or reel, the movable guard-hood, guides for retaining said guard in proper relation as it moves to and from the reel or supporting-table, and means for elevating and lowering said guard, substantially as and for the purposes set forth.

Witness my hand this 25th day of March, A. D. 1887.

FRED H. DANIELS.

Witnesses:
　CHAS. H. BURLEIGH,
　ELLA P. BLENUS.